United States Patent [19]
Stevens

[11] Patent Number: 5,572,335
[45] Date of Patent: Nov. 5, 1996

[54] METHOD AND SYSTEM FOR TRANSFERRING IMAGE DATA BETWEEN TWO DEVICES HAVING DIFFERENT BANDWIDTHS

[75] Inventor: James W. Stevens, Rochester, N.Y.

[73] Assignee: Xerox Corporation, Stamford, Conn.

[21] Appl. No.: 222,200

[22] Filed: Apr. 1, 1994

[51] Int. Cl.[6] .................. H04N 1/36; H04N 1/00; H04N 1/32; H01J 1/00
[52] U.S. Cl. .............. 358/442; 358/409; 358/404; 395/200.13; 395/250
[58] Field of Search ................. 358/442, 445, 358/447, 448, 406, 409, 411, 412, 486, 404, 468, 497, 410, 451; 395/200.13, 200.20, 200.21, 250; H04N 1/36, 1/00, 1/32; H01J 1/00, 5/06, 13/00

[56] References Cited

U.S. PATENT DOCUMENTS

| | | | |
|---|---|---|---|
| 3,428,744 | 2/1969 | Green et al. | 178/6 |
| 3,436,474 | 4/1969 | Saeger et al. | 178/7.1 |
| 3,502,803 | 3/1970 | Bigenwald et al. | 178/6.6 |
| 3,524,926 | 8/1970 | Starr et al. | 178/6 |
| 3,902,009 | 8/1975 | Perreault | 178/6 |
| 4,367,493 | 1/1983 | Matteson | 358/409 |
| 4,541,061 | 9/1985 | Schoon | 364/518 |
| 4,587,415 | 5/1986 | Tsunekawa et al. | 250/204 |
| 4,628,368 | 12/1986 | Kurata et al. | 358/293 |
| 4,748,514 | 5/1988 | Bell | 358/486 |
| 4,878,119 | 10/1989 | Beikirch et al. | 358/471 |
| 4,910,607 | 5/1990 | Kita et al. | 358/448 |
| 5,021,892 | 6/1991 | Kita et al. | 358/448 |
| 5,043,827 | 8/1991 | Beikirch | 358/471 |
| 5,113,260 | 5/1992 | Tandon | 358/213.11 |
| 5,239,387 | 8/1993 | Stein et al. | 358/444 |
| 5,278,974 | 1/1994 | Lemmon et al. | 395/550 |
| 5,369,504 | 11/1994 | Walker | 358/447 |

FOREIGN PATENT DOCUMENTS 0507439  10/1992  European Pat. Off. .......... G06F 3/00

OTHER PUBLICATIONS

Patent Abstract of Japan, Uchida Seigo; others: Title: Original Moving Type Picture Reader, ab. Date: Jan. 17, 1990, p. 1.

Patent Abstract of Japan, Kamishiro Toshiaki, Title: Image Transmission Equipment. ab. Date: Oct. 20, 1993, p. 1.

Primary Examiner—Kim Vu
Assistant Examiner—Kimberly A. Williams
Attorney, Agent, or Firm—Michael J. Nickerson

[57] ABSTRACT

An image input terminal synchronously transfers image data to a host terminal when the internal data transfer rate of the image input terminal exceeds the data transfer rate of the host terminal. The image input terminal scans the document at a constant rate, but the constant rate is slower than the normal scan rate for the image input terminal, thereby effectively scanning the document at a higher resolution. To realize an apparent internal data transfer rate equal to the data transfer rate of the host terminal, the image input terminal periodically discards or skips scanlines of valid image data to give the host terminal ample time to complete the transfer of valid image data. The image input terminal, to facilitate a synchronous transfer of image data, will skip N−1 scanlines of valid image data out of N scanlines of valid image data such that N is determined by the data transfer rate of the host terminal.

22 Claims, 8 Drawing Sheets

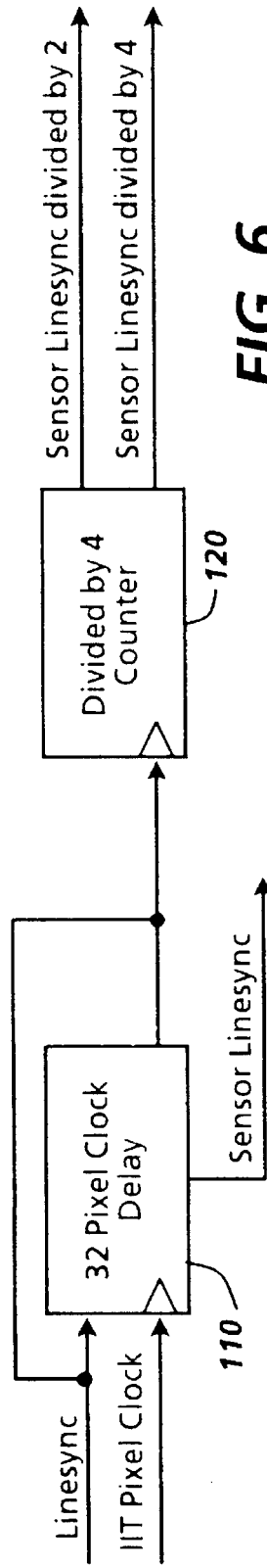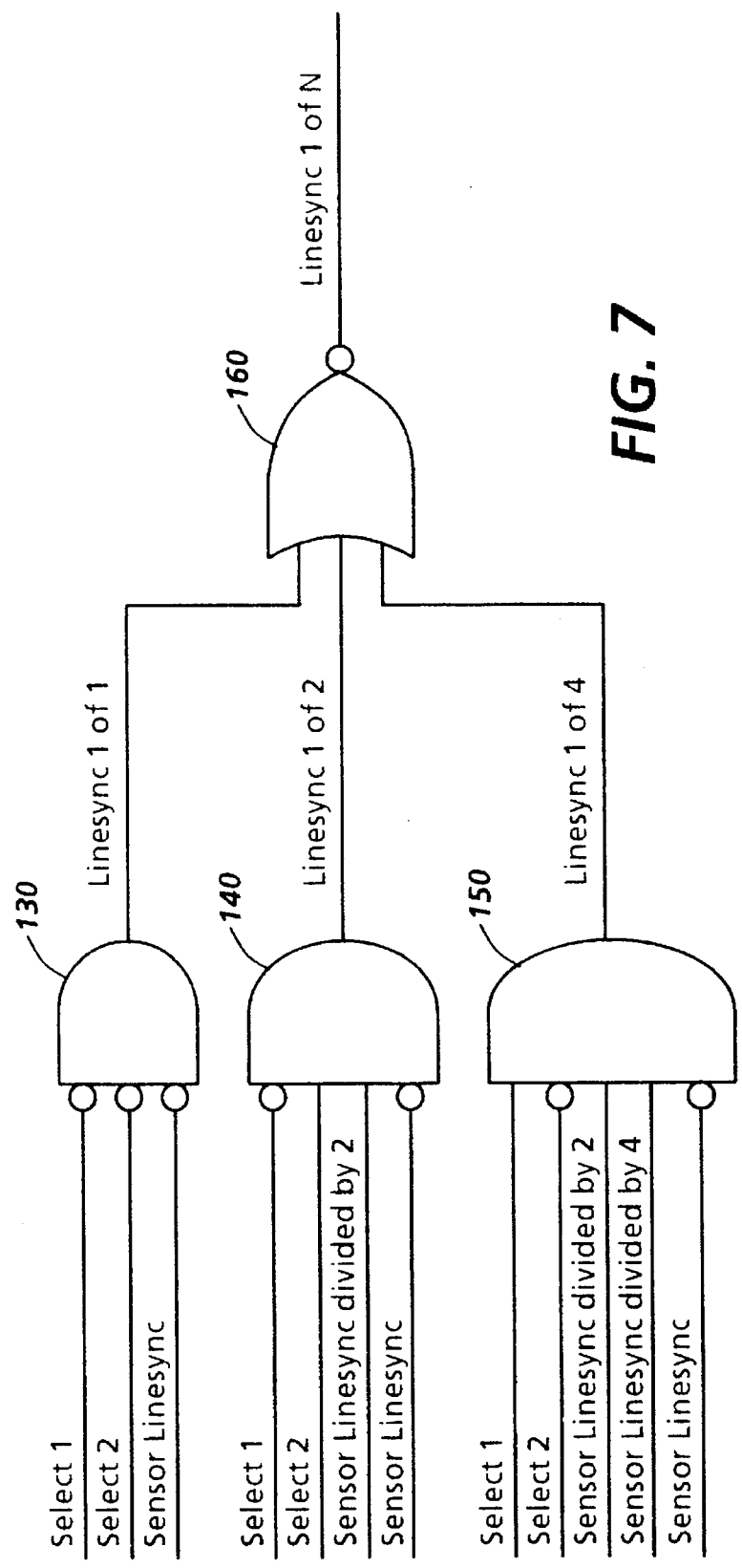
FIG. 6
FIG. 7

METHOD AND SYSTEM FOR TRANSFERRING IMAGE DATA BETWEEN TWO DEVICES HAVING DIFFERENT BANDWIDTHS

FIELD OF THE PRESENT INVENTION

The present invention is directed to a device or method for transferring scanned video data between an image input terminal and a host terminal. More specifically, the present invention is directed to controlling the scanning speed of an image input terminal when the internal data rate of the image input terminal exceeds the clock rate of the host interface.

BACKGROUND OF THE PRESENT INVENTION

Raster input scanners typically employ one or more arrays such as CCDs for scanning. The array converts each scanned image line into a series of charges which, following suitable processing, are output as image signals or pixels to an end user. The scanning array, for example, may be carried on a carriage which traverses back and forth under a platen to provide the necessary relative motion between the image and array. Other arrangements such as a lamp scanning array with a movable document, etc., may also be utilized. An optical system focuses the reflected image onto the array, and one or more lamps provide illumination of the image.

In a typical scanning process, the image area viewed by each array of photosensors is converted into a charge potential representative of the image's gray level. Scanning takes place during an integration period of a preset duration. Following integration, the image charges are transferred to a pair of analog shift registers, the operating sequence being such that during the integration period, the image charges (image data) from a previous scanline are clocked from the shift registers, leaving the shift registers free to receive the image charges from the next integration period. The duration of the integration period, which must be sufficiently long to fully integrate the image line being scanned yet not so long as to allow the array of of photosensors to become saturated, is measured by a periodic fixed rate clock signal or shift pulses.

When the scanner operates in a synchronized manner, relative scanning movement between the array and images are at a fixed rate. This in turn permits timing of the shift pulses in the signal requesting the next line of image signals, referred to as the integration signals, to be synchronized with one another.

However, when a scanner operates asynchronously; i.e., when the internal transfer rate of the image input terminal is faster than the data transfer rate of the device receiving the image data; the relative scanning movement between the array and image is not fixed, but random and changes with demand. In other words, the signals are produced in response to the movement of the array or document. As a result, the timing of the integration signal timing can vary and not be in synchronism with the fixed rate shift pulses. This can reduce the integration period, resulting in an incomplete integration of the image line being scanned.

Many methods and devices have been developed which provide asynchronous transfer when there is a difference in the transfer rate between the sending and receiving devices and also address the incomplete integration problem. These various approaches will be briefly discussed below.

U.S. Pat. No. 4,541,061 to Schoon discloses an approach wherein the operating clock signal of a scanning apparatus is provided at a rate that matches the varying velocity of the scanning mirror through the use of a memory in which various clock rates are stored based on the known repetitive movement of the mirror. The entire contents of this U.S. Patent are hereby incorporated by reference.

Another approach has been proposed in U.S. Pat. No. 4,587,415 to Tsunekawa et al. This U.S. Patent discloses a photodetector with a timing control unit for controlling the information storage and information read out process of the detector. The entire contents of this U.S. Patent are hereby incorporated by reference.

Moreover, U.S. Pat. No. 4,628,368 to Kurata et al. discloses a system for controlling the scanning rate of a document reader in which the speed, acceleration, and the deceleration of the reader are set according to image information stored in a buffer memory. The entire contents of this U.S. Patent are hereby incorporated by reference.

U.S. Pat. No. 5,043,827 to Beikirch disclose a scanning system which corrects for incomplete integration. The scanning system utilizes an interpolator to provide a composite line of image signals when an integration period is prematurely terminated. The entire contents of this U.S. Patent are incorporated by reference Furthermore, U.S. Pat. No. 4,878,119 to Beikirch et al. discloses a process for operating a scanning array asynchronously. The array has at least one row of sensors for scanning an image viewed by the array during an integration period and a shift register for receiving the signal charges developed by the sensor following the integration period. This process includes periodically generating, at a constant clock rate, integration pulses defining a succession of predetermined integration intervals and generating a start integration signal in response to a demand for a line of image signals where the time at which the start integration signals occurs is different than the time at which the integration pulses occur. The process interrupts the current integration interval in response to a start integration signal to commence a new integration interval to provide the asynchronous transfer of a line of image signals. The entire contents of this U.S. Patent are hereby incorporated by reference.

By using asynchronous stop/stop scanning, the optical system or documents are slowed down or stopped completely until an output buffer in the image input terminal is empty enough to resume scanning. The video data timing is not synchronous to a fixed clock, but is dependent upon the motion control system. This involves a more complex control system and has motion and image quality issues associated therewith.

In addition to an asynchronous transfer system, a large memory buffer can be used in the image input terminal to address the problem of differing transfer rates. In this situation, a complete page can be stored in resident memory and transferred at the rate utilized by the interface of the host. However, this technique increases the cost to the system in terms of additional components call on power consumption, and the physical space required by the page memory.

A problem exists when attempting to transfer scanned video data between an image input terminal and the host terminal when the internal data transfer rate of the image input terminal exceeds or is capable of exceeding the transfer rate of the host terminal. An example of such a situation is when the output of the scanner is gray video which is many times the volume of a threshold binary image.

This produces a data rate mismatch, which can result in a truncated or corrupted page.

Another problem associated with transferring of data is the limited bandwidth of a synchronous clock image input terminal/host interface when used with an image input terminal which is capable of producing a wide range of data volumes and rates. An example is an image input terminal capable of producing binary and gray video data at various resolutions. In a binary mode, the data rates can be managed; however, when used in a gray output mode, the data rates become prohibitive. This is especially true when the interface is governed by the host terminal which receives the data. Also, when the image input terminal produces video data which exceeds the synchronous host interface rate, such as in a gray output mode, the output video page is corrupted.

To prevent or avoid these problems; i.e., the mismatching of transfer rates, the present invention scans at a slower speed with the same integration time; i.e., a higher resolution, and periodically discards or skips a selected number of scanlines of valid image data to cause the scanner to realize a virtual or apparent data transfer rate which is equal to or less than the data transfer rate of the host terminal. In other words, the internal data transfer rate of the scanner is masked such that the transfer rate as perceived externally is equal to or less than the data transfer rate of the host terminal.

SUMMARY OF THE PRESENT INVENTION

One aspect of the present invention is a system for transferring video data from an image input terminal to a host terminal. The host terminal has a transfer rate slower than an internal data transfer rate of the image input terminal. The system includes a controller for selecting a scan rate and a line sampling rate. An image scanner is connected to the controller and scans an original at the selected scan rate to produces lines of image data. A buffer stores only a portion of the produced lines of valid image data according to the selected line sampling rate. An interface then outputs the stored lines of image data to the host terminal.

Another aspect of the present invention is a method for transferring video data from an image input terminal to a host terminal. The host terminal has a transfer rate slower than an internal data transfer rate of the image input terminal. The method selects a scan rate and a line sampling rate. An original is scanned at the selected scan rate to produce lines of image data. Only a portion of the produced lines of valid image data are selected and stored. The remaining portion of produced lines of valid image data are skipped. The stored lines of image data are output to the host terminal.

A third aspect of the present invention is a method of transferring video data from an image input terminal to a host terminal. The host terminal has a transfer rate slower than an internal data transfer rate of the image input terminal. The method generates a set or multiple sets of N lines of valid image data wherein N is two or more. One line of any set of N lines of valid image data is stored, while N-1 lines of valid image data from any set of N lines of valid image data are discarded. The stored line of valid image data is output to the host terminal.

A fourth aspect of the present invention is a system for transferring video data from an image input terminal to a host terminal. The host terminal has a transfer rate slower than an internal data transfer rate of the image input terminal. The system includes an image device for generating a set or multiple sets of N lines of valid image data wherein N is equal to two or more. A buffer stores one line of any set of N lines of valid image data. The system further includes a skipping circuit for preventing the buffer from storing N-1 lines of valid image data from any set of N lines of image data. An interface outputs the stored line of image data to the host terminal.

Further advantages of the present invention will become apparent from the following description in the various features of the present invention.

BRIEF DESCRIPTION OF THE DRAWINGS

The following is a brief description of each drawing used to describe the present invention, and thus, are being presented for illustrative purposes only and should not be limited of the scope of the present invention, wherein:

FIG. 6 is a block diagram illustrating a circuit for generating sensor linesync signals in the present invention;

FIG. 7 is a block diagram illustrating a circuit for generating a linesync 1 of N signal in the present invention;

DETAIL DESCRIPTION OF THE PRESENT INVENTION

Figure 1:
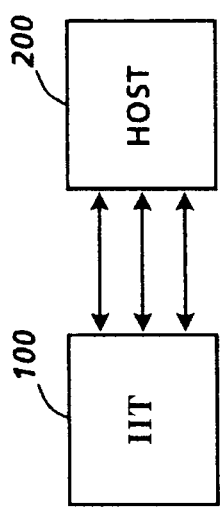
FIG. 1 is a block diagram illustrating the relationship between an image input terminal and a host terminal.

The following will be a detailed description of the drawings illustrating the present invention. In this description, as well as in the drawings, like reference numbers represent devices, circuits, or equivalent circuits which perform the same or equivalent functions.

FIG. 1 illustrates a relationship between an image input terminal 100 and a host terminal 200. The image input terminal (ITT) 100 converts an image reflected from a document into electrical signals. These electrical signals (video data) are then transferred to the host terminal 200 serially or in parallel. The host terminal 200 can be either a print engine, a computer processor, file server, an electronic storage device, or any electronic device capable of receiving or processing image data. Moreover, the ITT 100 and host terminal 200 communicate back and forth indicating when the host is ready for transfer as well as providing the necessary synchronization signals to bring about the transfer.

To synchronously transfer image data from the ITT 100 to the host terminal 200, the effective data transfer rate of the ITT terminal 100 must be equal to the transfer rate of the host terminal 200. In other words, a synchronous transfer of data from the ITT 100 to the host terminal 200 implies that scanner of the ITT 100 scans the image at a constant rate, using a constant integration time, without having to wait or stop the scanning process to allow the host terminal an opportunity to receive all the image data of a previous scanline prior to the scanner producing the next new scanline of valid image data.

Figure 2:
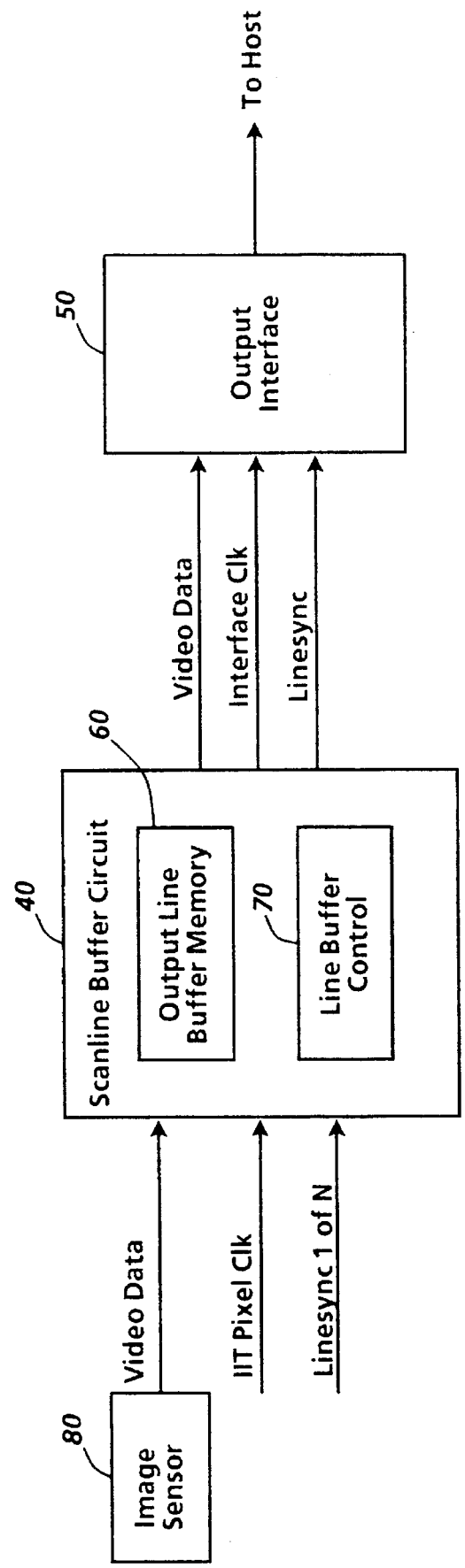
FIG. 2 is a block diagram illustrating the circuit for buffering the video data from the image input terminal.
Figure 5:
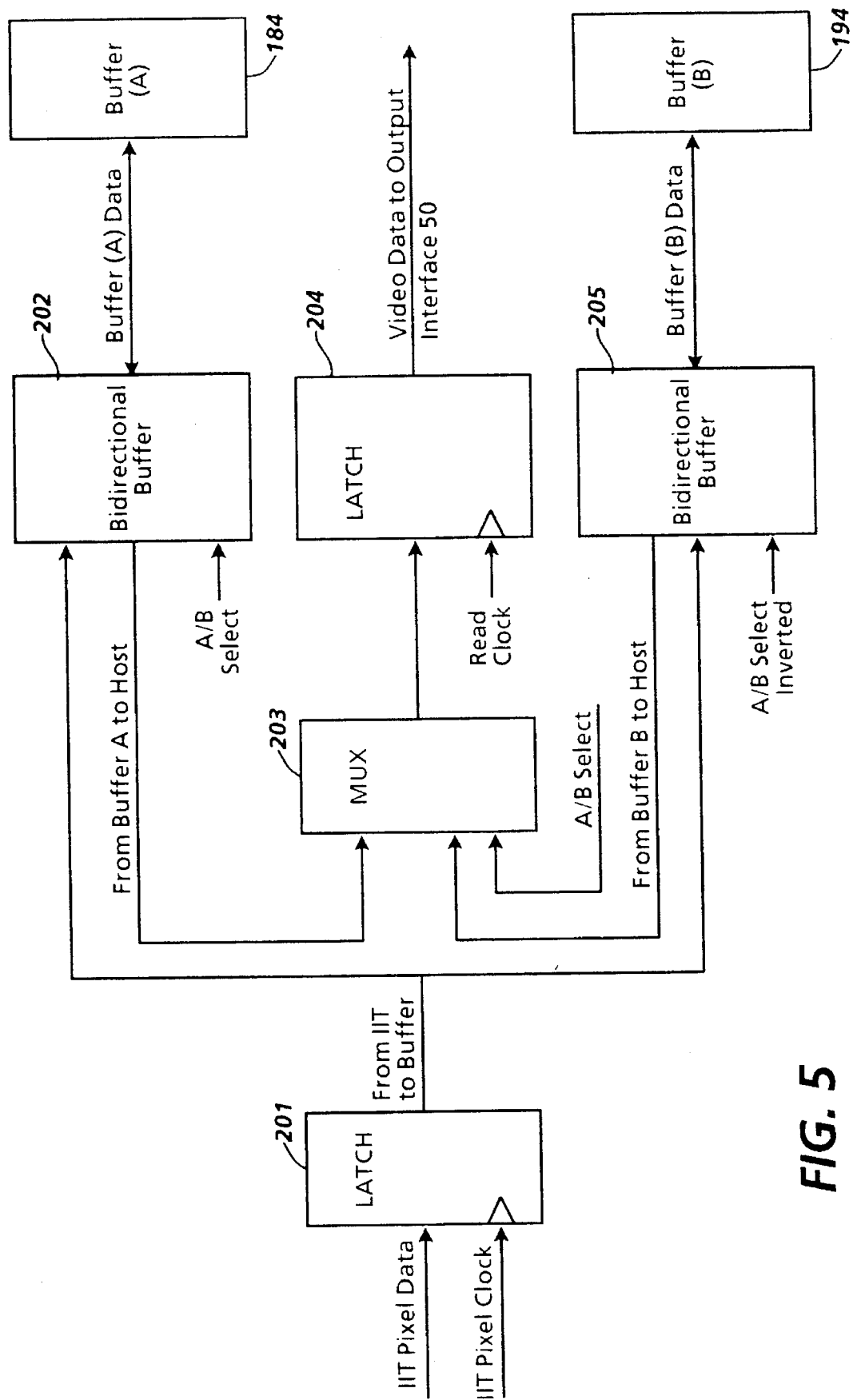
FIG. 5 is a block diagram illustrating a data transfer buffer circuit of a preferred embodiment of the present invention.

FIG. 2 illustrates a circuit used in buffering the video data received from an image sensor 80 before the video data is transferred to an output interface 50. As illustrated in FIG. 2, video data generated by the image sensor 80 is input to a line buffer 40. Line buffer 40 includes a line buffer memory 60 and a line buffer control circuit 70. The line buffer memory 60, in one embodiment of the present invention, is two separate scanline buffers which act in tandem to ensure proper transfer of the video data from the image sensor to the output interface 50. The separate scanline buffers of the preferred embodiment of the present invention are illustrated in FIG. 5.

During the proper buffering of video data, one of the scanline buffers receives video data from the image sensor 80 and temporarily stores this video data within its memory array, while the other scanline buffer outputs video data from a previous scanline to the output interface 50. The operations of the scanline buffers are controlled by the line buffer control circuit 70, in accordance with received image input terminal pixel clock signal and linesync 1 of N signal. The input terminal pixel clock signal enables the line buffer control circuit 70 to write individual pixels of video data into the scanline buffer 60. Moreover, the linesync 1 of N signal informs the line buffer control circuit 70 when the next scanline of video data will be input for buffering.

Figure 3:
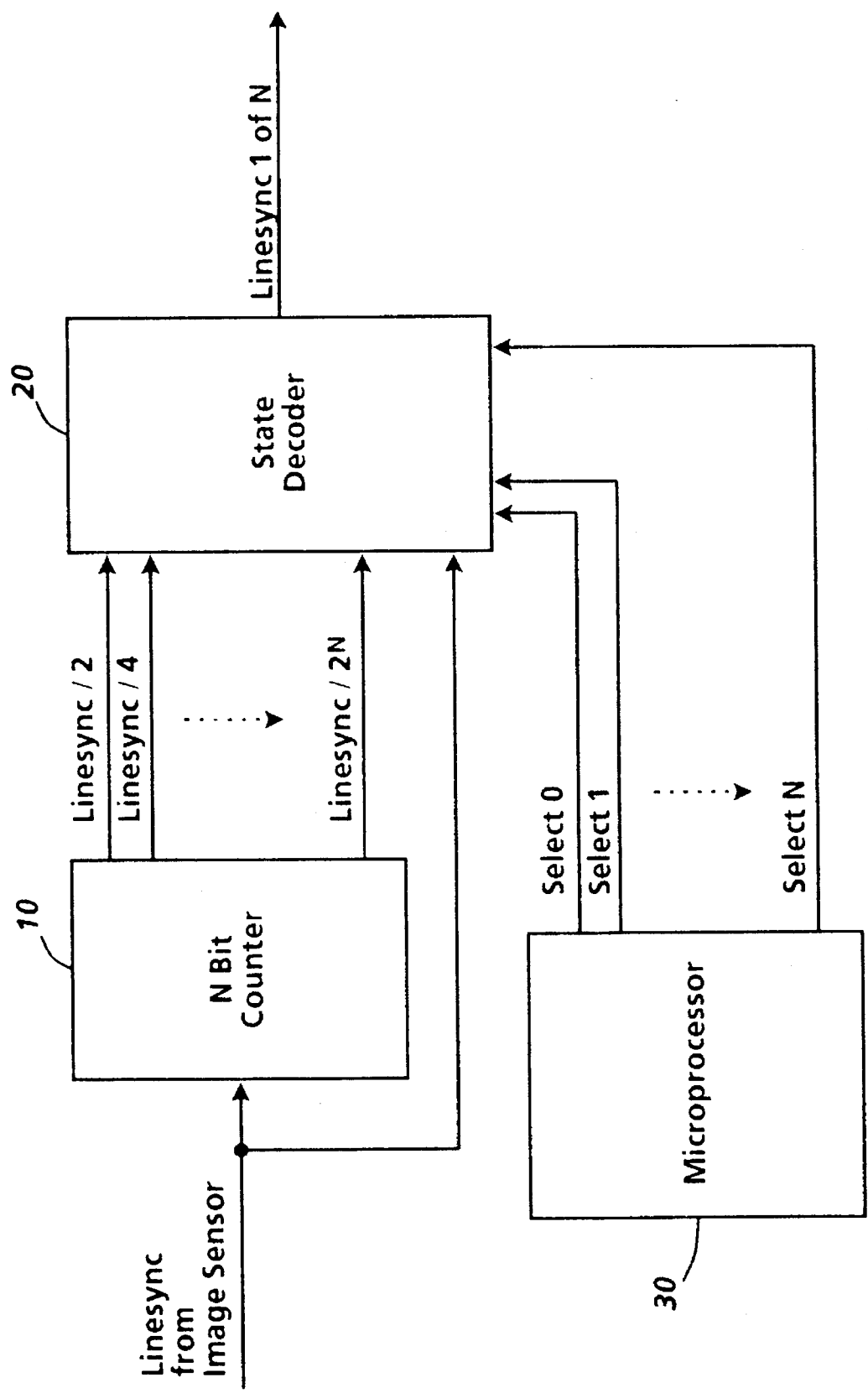
FIG. 3 is a block diagram illustrating a circuit for controlling the buffering operations of the present invention.

FIG. 3 illustrates a circuit for determining which scanlines of video data from the image sensor 80 are to be transferred to the host terminal and thus which scanlines of video data will be temporarily stored by an output scanline buffer. In FIG. 3, a linesync signal from the image sensor 80 of FIG. 2 is input into an N-bit counter 10 and a state decoder 20. The N-bit counter 10 outputs binary signals representing a relative scanline number within a set of scanlines. In other words, if the second scanline after resetting the counter (the counter is reset after the counter reaches its maximum count) is being scanned by the image sensor 80, the N-bit counter will output a logically active signal on the linesync/2 data line. Moreover, if the image sensor 80 is scanning the fourth scanline after resetting the counter, the N-bit counter 10 will output a logically active signal on the linesync/2 data line and the linesync/4 data line.

The state decoder 20 receives the input signals from the N-bit counter 10 and input signals from a microprocessor 30. The state decoder 20, from the inputs, determines which single scanline of valid data out of N scanlines of valid data is to be transferred to the host terminal and which scanlines out of the N scanlines of valid image data are to be discarded, skipped, or prevented from being temporarily stored in a scanline buffer. When the linesync I of N signal is logically active, the state decoder 20 indicates that the scanline of valid image data being presented to a scanline buffer should be temporarily stored in this buffer.

The number of scanlines N is predetermined according to the difference between the normal or typical internal data transfer rate of the IIT and the data transfer rate of the host terminal. The resolution at which the image is to be scanned, the size of the image and the number of bits per pixel are also factors in determining N.

For example, if half the number of scanlines generated by the image sensor are desired to pass through the system, the microprocessor produces signals which causes the state decoder to produce an active level logical state image sensor linesync signal for every second state of the N-bit counter. If every fourth line of video is desired, the microprocessor produces signals which causes the decoder to select an image sensor linesync signal corresponding to every fourth state of the N-bit counter. Moreover, if a 400 line per inch image is desired at half of the normal scanline rate of the image input terminal, the optical system or the document is moved at a velocity which would generate a 800 line per inch image of which every other scanline of valid image data is discarded.

FIG. 5 illustrates a scanline buffer data transfer circuit for a preferred embodiment of the present invention. Pixel data from the image input terminal (IIT) is input into a latch circuit 201 which latches the data in response to an IIT pixel clock signal. The pixel data from latch 201 is output to a bidirectional buffer 202 and a bidirectional buffer 205. Bidirectional buffer 202 controls the flow of data between the IIT and Buffer(A) 184 as well as the flow of data from Buffer(A) 184 to the host terminal 200 through the output interface 50. An A/B select signal controls whether Buffer(A) 184 is receiving data from the IIT or is outputting data. If Buffer(A) 184 is outputting data, the data from Buffer(A) 184 is passed through bidirectional buffer 202 and input into a multiplexer 203.

Bidirectional buffer 205 operates in the same manner as bidirectional buffer 202 except that the flow of data is controlled by an inverted A/B select signal. Thus, when bidirectional buffer 202 is allowing pixel data from the IIT to be stored in Buffer(A) 184, bidirectional buffer 205 is allowing the data stored in Buffer(B) 194 to be transferred to the host terminal 200 through the output interface 50. The data from Buffer(B) 194 passes through bidirectional buffer 205 and is input to the multiplexer 203 when the pixel data residing in Buffer(B) 194 is to be transferred to the host terminal 200. Multiplexer 203 selects either the data from Buffer(A) 184 or the data from Buffer(B) 194 (through the bidirectional buffers 202 and 205) in accordance with the A/B select signal. The data selected by multiplexer 203 is latched in latch circuit 204 to enable the proper transfer of the pixel data to the host terminal 200. The data from latch 204 is transferred to the host terminal 200 in accordance with the transfer rate required by the particular host terminal.

FIG. 6 illustrates a circuit utilized to generate the sensor linesync signal. A linesync signal from the IIT is input into a 32 pixel clock delay circuit 110 along with the IIT pixel clock signal. The 32 pixel clock delay circuit 110 ignores the first 32 pixels from the CCD before it produces a sensor linesync signal which indicates valid data from the CCD. The linesync signal that is input to the clock delay circuit 110 is also used to clock a counter 120 which produces, in the preferred embodiment, two binary outputs that can be used to determine which one line of a set of four lines is to be processed. The outputs of counter 120 are input to the circuit of FIG. 7 where they are used to select or discard sensor linesync signals.

FIG. 7 illustrates a circuit which produces the linesync 1 of N signal. More specifically, AND gates 130, 140, and 150 produce the signals linesync 1 of 1, linesync 1 of 2, and linesync 1 of 4, respectively. These signals are fed into a NOR gate 160, which produces the linesync 1 of N signal to be utilized by a buffer control unit. For example the linesync 1 of 4 signal is the result of discarding 3 of every 4 sensor linesync signals. It is noted that FIG. 7 only illustrates the generation of three separate linesync signals. This circuit can be easily modified to include any number of linesync signals by increasing the number of AND gates and adding more select (control) bits and increasing the size of the counter 120.

Figure 8:
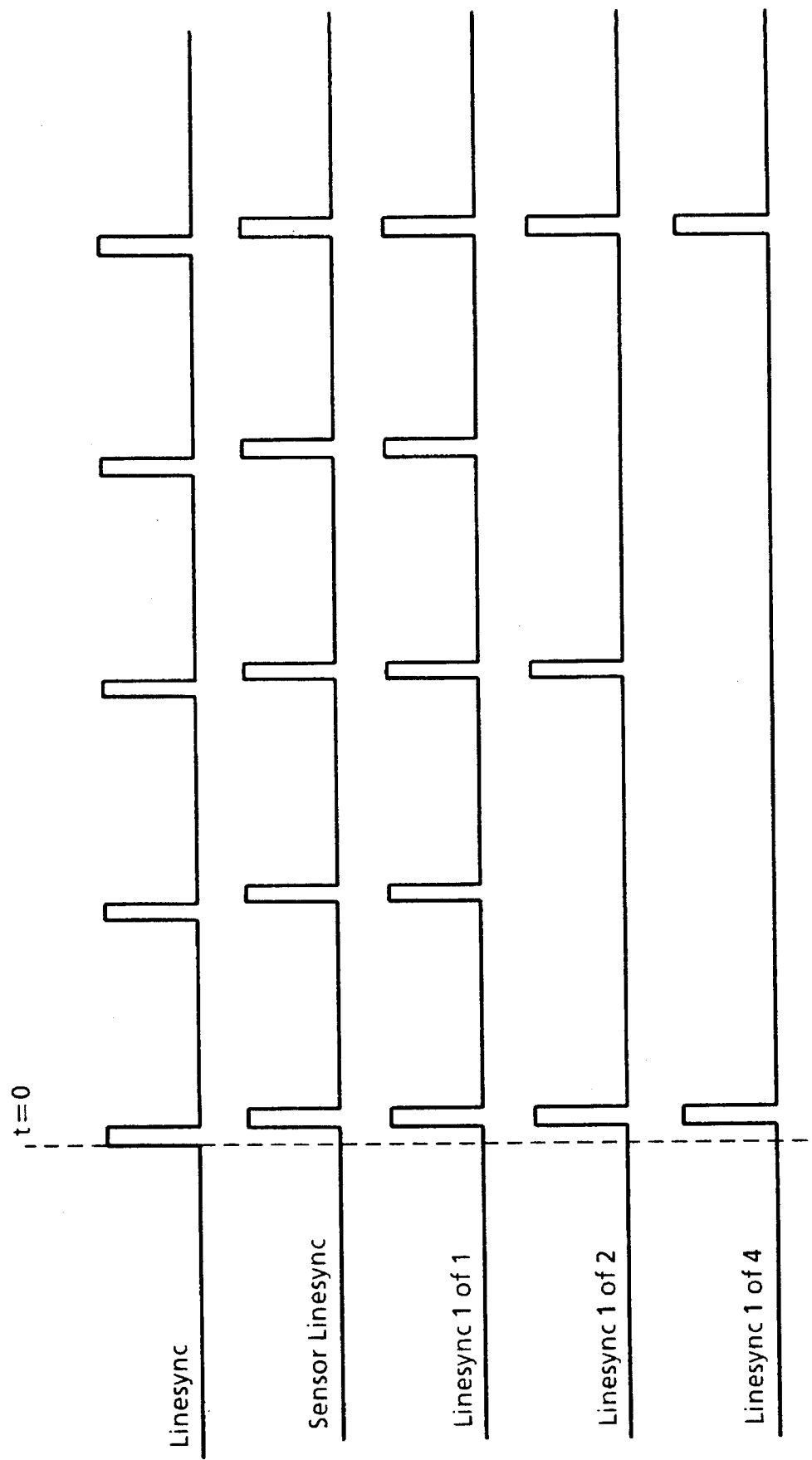
FIG. 8 is a timing diagram illustrating the generation the linesync 1 of N signal in the present invention.

FIG. 8 illustrates the timing diagram of the signals generated in FIG. 7 for three separate situations. In FIG. 8, the linesync signal corresponds to the signal generated by the IIT and the sensor linesync signal corresponds to the signal generated by the 32 pixel clock delay circuit 110. It is noted that the sensor linesync signal has the same periodicity as the linesync signal, but is delayed by 32 pixel clock cycles. The linesync 1 of 1 signal indicates the situation where every scanline from the image input terminal is transferred to the host terminal in a synchronous manner. In other words, the linesync 1 of 1 signal corresponds directly to the sensor linesync signal. The linesync 1 of 2 signal corresponds to the situation where every other scanline of valid image data from the IIT is transferred to the host terminal. Thus, the linesync 1 of 2 signal is generated for every two linesync 1 of I signals. The linesync 1 of 4 signal corresponds to the situation where one out of every four scanlines of valid image data generated by the IIT is transmitted to the host terminal. Thus, a linesync 1 of 4 signal is generated for every four linesync 1 of 1 signals.

Figure 9:
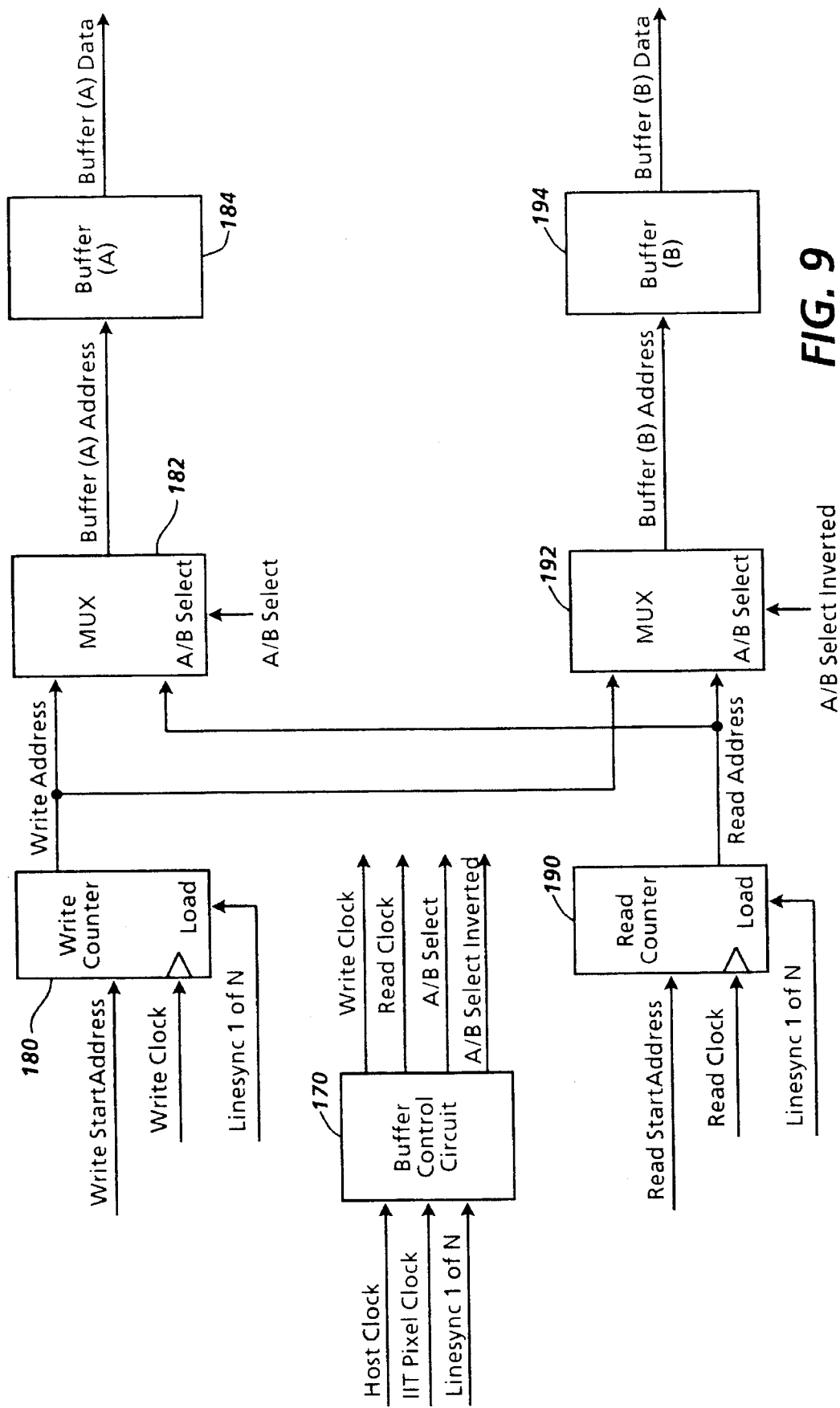
FIG. 9 is a block diagram illustrating one embodiment of an address control circuit for the present invention.

FIG. 9 illustrates a scanline buffer address control circuit without 180 degree rotation. A buffer control circuit 170 controls the various operations of the address control circuit in response to a host terminal clock signal, a IIT pixel clock signal, and a linesync 1 of N signal. The buffer control circuit 170, in response to the input signals, produces a write clock signal, a read clock signal, an A/B select signal, and an A/B select inverted signal. The scanline buffer address control circuit includes two counters 180 and 190.

Counter 180 is utilized to generate the write address for either Buffer(A) 184 or Buffer(B) 194. Counter 180 is loaded with a predetermined write start address in response to the load function being activated by the linesync 1 of N signal. A write clock signal is also fed into counter 180 in order to change the write address. The write clock signal is derived from the the IIT pixel clock input to the buffer control circuit 170. The write address output from counter 180 is fed into multiplexer 182 and multiplexer 192.

Multiplexer 182 and 192 determine whether the write address is fed to either Buffer(A) 184 or Buffer(B) 194 in response to the A/B select signal and A/B select inverted signal, respectively.

Counter 190 produces the read address to be utilized by Buffer(A) 184 and Buffer(B) 194. A predetermined read start address is loaded into counter 190 in accordance with the linesync 1 of N signal activating the load function. A read clock signal is also fed into counter 190 in order to change the read address. The read clock signal is derived from the the host clock input to the buffer control circuit 170. The read address output from the counter 190 is fed into multiplexer 182 and multiplexer 192. The selection of the read address for either Buffer(A) 184 or Buffer(B) 194 is controlled by the A/B select signal and A/B select inverted signal, respectively. Accordingly, when multiplexer 182 is feeding the write address to Buffer(A) 184, multiplexer 192 is feeding the read address to Buffer(B) 194. Thus, Buffer(A) can be storing image data from the IIT, while Buffer(B) can be transferring image data to the host terminal.

Figure 10:
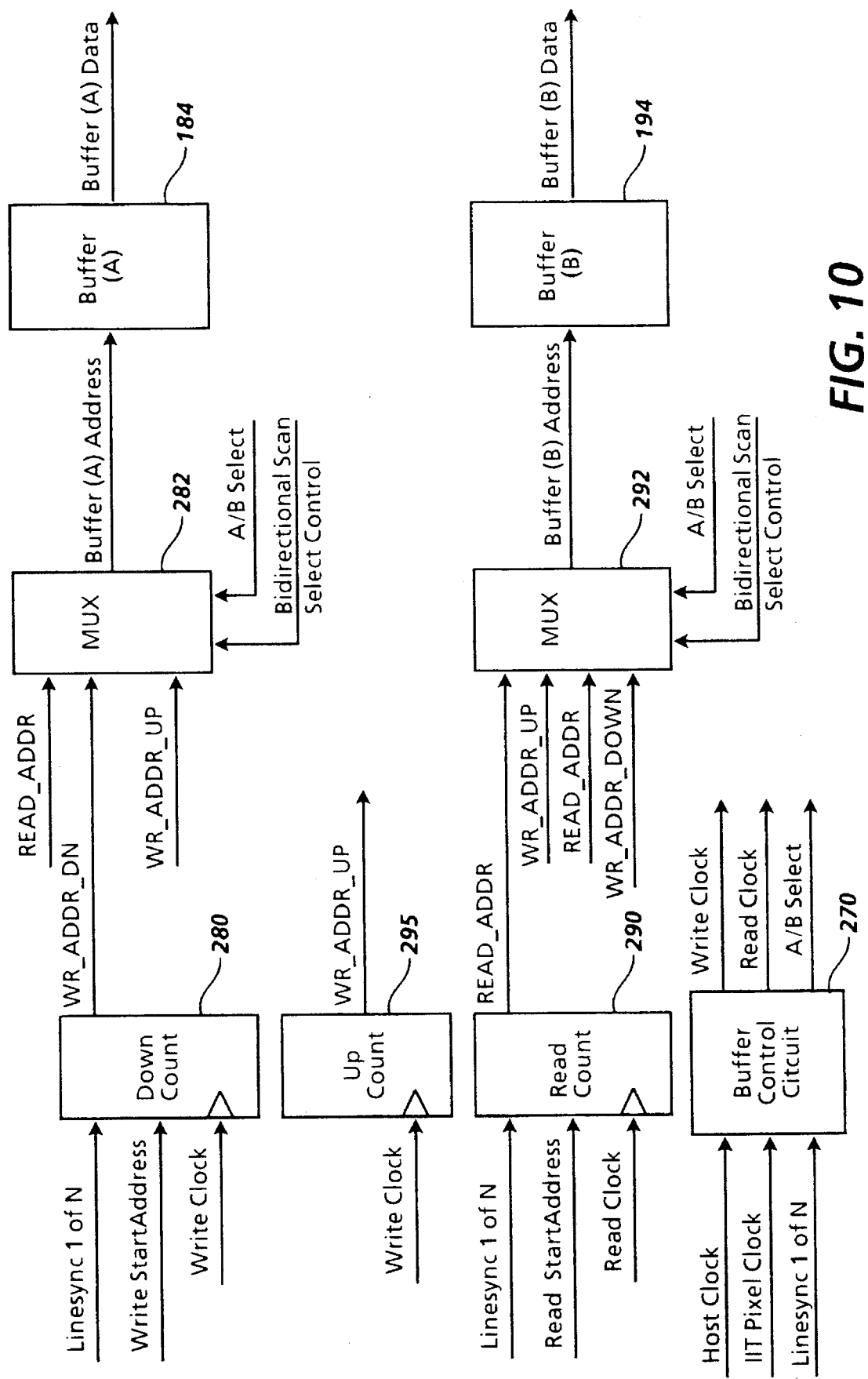
FIG. 10 is a block diagram illustrating a preferred embodiment of an address control circuit for the present invention.

FIG. 10 illustrates a preferred embodiment of the output buffer which allows for 180° rotation in the IIT. In this embodiment, a buffer control circuit 270 receives a host clock signal, an IIT pixel clock signal, and a linesync 1 of N signal. From these input signals, the buffer control circuit 270 produces a write clock signal, a read clock signal, and an A/B select signal. FIG. 10 operates in much the same manner as FIG. 9, except that FIG. 10 has two separate counters to produce the write addresses. More specifically, FIG. 10 illustrates the utilization of a writedown counter 280 and a write-up counter 295. The read counter 290 in FIG. 10 operates in the same manner as counter 190 of FIG. 9.

To enable the 180° rotation, FIG. 10 includes two multiplexers 283 and 293. Each multiplexer receives a read address from read counter 290 and a write-up address and a write-down address from counters 295 and 280, respectively. An A/B select signal is also fed to the two multiplexers 283 and 293 to enable the multiplexers to choose between the read address or the write addresses. Thus, the A/B select signal operates in essentially the same manner as the A/B select signal and A/B select inverted signal of FIG. 9.

To effectuate 180° rotation, a bidirectional scan select control signal is fed to each multiplexer 283 and 293. The bidirectional scan select control signal enables the selection of either the write-down address when rotation is not desired or the write-up address when 180° rotation is desired. In other words, to accomplish rotation, the image data from the IIT is written into the buffer in the opposite direction from which it is read out. The proper addresses as selected by the multiplexers 283 and 293 are fed to Buffer(A) 184 and Buffer(B) 194 so that the proper operations can be carried out as described above. The bidirectional scan select control signal can be generated by either a control unit or user interface when establishing the status of the rotation state.

Figure 4:
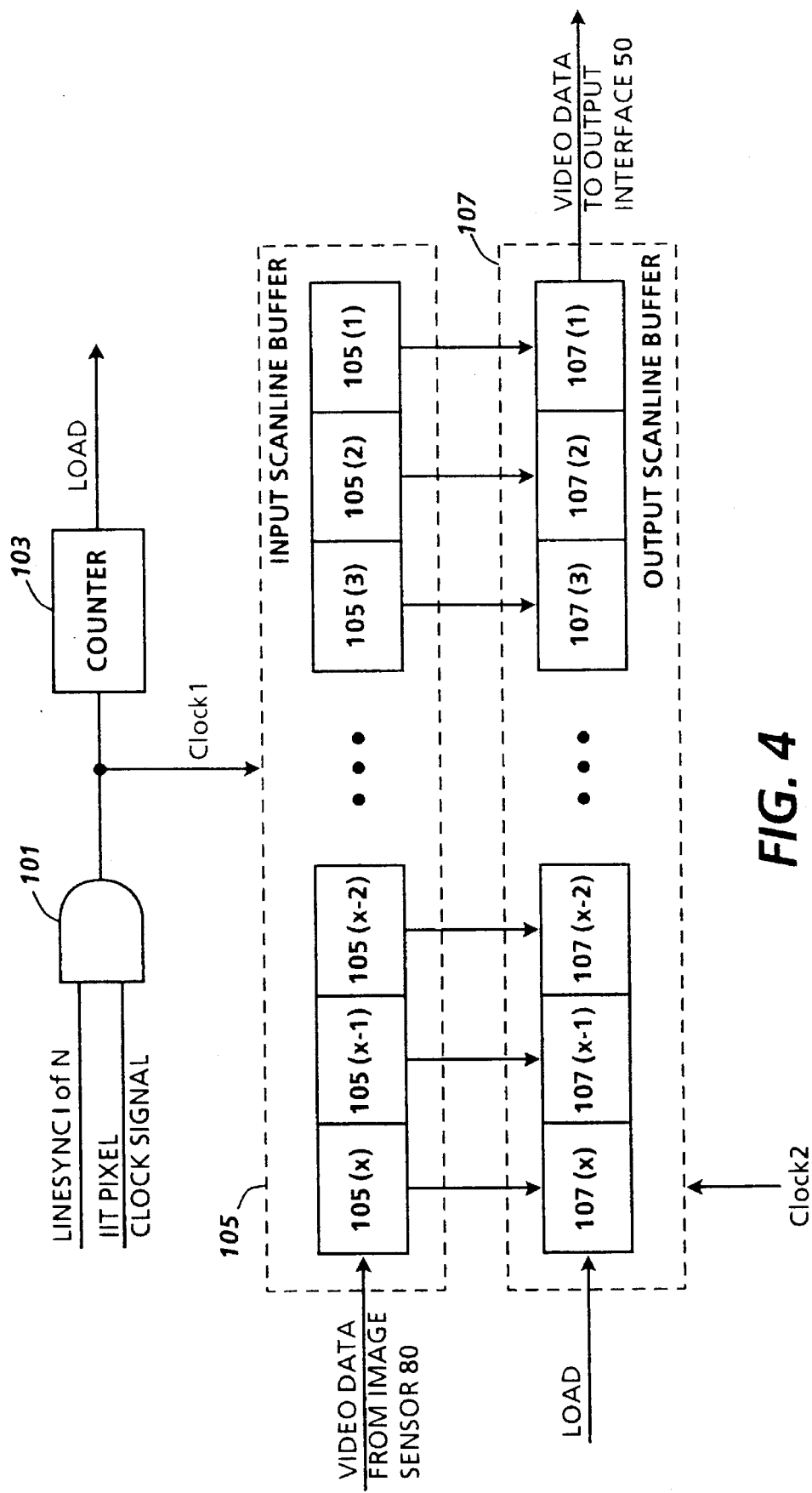
FIG. 4 is a block diagram showing the buffering operations of one embodiment of the present invention.

FIG. 4 illustrates another embodiment of the scanline buffer circuit 40 of FIG. 2. In FIG. 4, video data from the image sensor 80 is fed into an input scanline buffer 105 containing a plurality of memory locations. More specifically, each memory address 105(1), 105(2), 105(3) ... to 105(x-2), 105(x-1), 105(x), stores data for an individual pixel within a scanline. Data corresponding to the first pixel of a scanline is input into the memory address 105(x) and then the pixel data is shifted to the next memory location (105(x-1))in the array in response to a pixel clock signal. The input scanline buffer 105 operates like a shift register having the capacity to hold one scanline of image data. In response to a load signal that is derived from the linesync signals generated for indicating the end of a scanline, the contents of input scanline buffer 105 are loaded into output scanline buffer 107 with the contents of 105(x) being transferred to 107(x), the contents of 105(x-1) being transferred to 107(x-1), and the contents of 105(x-2) being transferred to 107(x-2), etc.

After being loaded into the output scanline buffer 107, the video data is again shifted right in response to a second clock signal corresponding to the clock rate of the host terminal such that the video data output from the register 107(1) is serial input to the output interface 50.

To clarify the description of the present invention, the operations of the present invention will be explained in more detail below in conjunction with the drawings and Tables 1–3.

Table 1 shows the situation when the internal transfer rate of the image input terminal is equal to the data transfer rate of the host terminal, a normal synchronous operation. In this situation, during each integration period, image data is formed by the CCD sensors and stored in the buffer. Also, during a single integration period, the stored image data in the buffer is transferred to the host terminal.

TABLE 1

| DEVICE | INTEGRATION PERIOD 1 | INTEGRATION PERIOD 2 | INTEGRATION PERIOD 3 | INTEGRATION PERIOD 4 | INTEGRATION PERIOD 5 | INTEGRATION PERIOD 6 | INTEGRATION PERIOD 7 | INTEGRATION PERIOD 8 | INTEGRATION PERIOD 9 |
|---|---|---|---|---|---|---|---|---|---|
| CCD | output d1 | output d2 | output d3 | output d4 | output d5 | output d6 | output d7 | output d8 | output d9 |
| BUFFER | store d1 | store d2 | store d3 | store d4 | store d5 | store d6 | store d7 | store d8 | store d9 |
| I/O | X | output d1 | output d2 | output d3 | output d4 | output d5 | output d6 | output d7 | output d8 |

For example, during integration period 1, as shown in Table 1, the array of CCD sensors outputs a single scanline of valid image data, d1. During integration period 1, this single scanline of valid image data, d1, is stored in a first buffer. At the end of integration period 1, the first buffer begins transferring the data, d1, to the host terminal to be carried out during integration period 2, while the array of CCD sensors outputs another single scanline of valid image data, d2, wherein this single scanline of valid image data, d2, is stored in a second buffer. Moreover, during integration period 2, the contents of output scanline buffer 107 are fully transferred to the host terminal. At the end of integration period 2, the second buffer begins transferring data, d2, to the host terminal while the first buffer begins receiving data, d3. Thus, the process begins again.

As shown by Table 1, the host terminal only requires a single integration period to receive all the valid image data for a single scanline. In other words, the internal transfer rate of the image input terminal is equal to the data transfer rate of the host terminal, and a synchronous transfer can be realized.

Table 2 shows an operation where the internal transfer rate of the image input terminal is greater than the data transfer rate of the host terminal. In this situation, during each integration period, image data is formed by the CCD sensors. However, in contrast to the situation shown in Table 1, not all the valid image data is stored in the buffer. Moreover, the host terminal requires two integration periods to properly transfer a single scanline of valid image data from the image input terminal.

the first buffer is transferred to the host terminal. The single scanline of valid image data, d2, produced during integration period 2 is not stored in a buffer, but is actually skipped or discarded.

The array of CCD sensors outputs another single scanline of valid image data, d3, wherein this single scanline of valid image data, d3, is stored in a second buffer during integration period 3. Moreover, the final portion of the contents of the first buffer is transferred to the host terminal. At the end of integration period 3, the second buffer begins transferring its contents, d3, to the host terminal, and the process begins again.

As shown by Table 2, the host terminal requires two integration periods to receive all the valid image data for a single scanline. In other words, the internal transfer rate of the image input terminal is as much as twice the data transfer rate of the host terminal. Moreover, by skipping every other scanline of valid image data and maintaining the integration period at a constant rate, a synchronous transfer can be realized.

TABLE 2

| DEVICE | INTEGRATION PERIOD 1 | INTEGRATION PERIOD 2 | INTEGRATION PERIOD 3 | INTEGRATION PERIOD 4 | INTEGRATION PERIOD 5 | INTEGRATION PERIOD 6 | INTEGRATION PERIOD 7 | INTEGRATION PERIOD 8 | INTEGRATION PERIOD 9 |
|---|---|---|---|---|---|---|---|---|---|
| CCD | output d1 | output d2 | output d3 | output d4 | output d5 | output d6 | output d7 | output d8 | output d9 |
| BUFFER | Store d1 | skip d2 | store d3 | skip d4 | store d5 | skip d6 | store d7 | skip d8 | store d9 |
| I/O | X | output d1 | output d1 | output d3 | output d3 | output d5 | output d5 | output d7 | output d7 |

During integration period 1, as shown in Table 2, the array of CCD sensors outputs a single scanline of valid image data, d1. During integration period 1, this single scanline of valid image data, d1, is stored in a first buffer. At the end of integration period 1, the first buffer begins transferring the data, d1, to the host terminal to be carried out during integration period 2, while the array of CCD sensors outputs another single scanline of valid image data, d2. It is noted that during integration period 2, a portion of the contents of Table 3 shows another operation where the internal transfer rate of the image input terminal is greater than the data transfer rate of the host terminal. In this situation, the host terminal requires four integration periods to properly transfer a single scanline of valid image data from the image input terminal.

TABLE 3

| DEVICE | INTEGRATION PERIOD 1 | INTEGRATION PERIOD 2 | INTEGRATION PERIOD 3 | INTEGRATION PERIOD 4 | INTEGRATION PERIOD 5 | INTEGRATION PERIOD 6 | INTEGRATION PERIOD 7 | INTEGRATION PERIOD 8 | INTEGRATION PERIOD 9 |
|---|---|---|---|---|---|---|---|---|---|
| CCD | output d1 | output d2 | output d3 | output d4 | output d5 | output d6 | output d7 | output d8 | output d9 |
| BUFFER | store d1 | skip d2 | skip d3 | skip d4 | store d5 | skip d6 | skip d7 | skip d8 | store d9 |
| I/O | X | output d1 | output d1 | output d1 | output d1 | output d5 | output d5 | output d5 | output d5 |

The situation shown in Table 3 is similar to that shown by Table 2, thus only the differences will be discussed for the sake of brevity. In the situation of Table 3, a buffer transfers approximately one fourth of its contents each integration period; therefore, the data transfer buffer circuit only stores one out of four scanlines of valid image data.

As shown by Table 3, the host terminal requires four integration periods to receive all the valid image data for a single scanline. In other words, the internal transfer rate of the image input terminal is as much as four times the data transfer rate of the host terminal. Moreover, by skipping three out of four scanlines of valid image data and maintaining the integration period at a constant rate, a synchronous transfer can be realized.

The present invention reduces the data transfer rate of the image input terminal while leaving integration time of the image sensor unchanged. This is accomplished by moving the optical system or document at a slower speed and skipping a selected number of scanlines of valid image data in a periodic manner. Thus, the image is sampled at a higher (slow scan) resolution and the data is only output periodically to allow the output interface to keep up with the data transfer rate of the image input terminal. The slow scan speed and periodic line sampling rates are selected by the image input terminals microprocessor based on the volume of data which is to be produced. The volume is known based on the document size, resolution, and mode, i.e., gray or binary.

To realize the masking of the internal data transfer rate of the IIT, the present invention utilizes a binary counter and state decoder to count scanlines from the image sensing circuitry. The buffer is used to absorb the image input terminal video or image data, and a line signal from the image sensor 80 is used to clock a counter. The outputs of the counter are used in conjunction with a microprocessor which outputs signals used to derive the linesync 1 of N signal. The linesync 1 of N signal is generated by selecting one of every N image sensor linesync cycles where (N-1) is a number of scanlines of the valid video data to be discarded.

When the linesync 1 of N signal is in a logical inactive state video data coming from the image sensor is suppressed. More specifically, a buffer, when the linesync 1 of N signal is inactive, will not store or clock-in any data from the image sensor 80. In conjunction with the line selection logic, the scan speed of the optics or document is changed by the ratio of the selected lines of video data to the actual lines of video produced by the sensor. The function of the scanline buffer is to accept image data at the system internal data transfer rate and output image data to the image input terminal interface at the clock rate of the host terminal interface.

To accomplish this process, the scanline buffer control circuitry is used to generate two sets of timing signals for the buffer. The input side of the buffer is filled with a scanline of image data in synchronism with the internal pixel transfer rate of the image input terminal. The output side of the buffer provides data to the interface synchronously with a slower clock which is compatible with the host terminal. Image data is read from a buffer and during the entire period which the linesync 1 of N signal is both logically active and inactive. However, a scanline buffer is filled only while the linesync 1 of N signal is logically active. Therefore, the amount of time available to move a scanline of image data over to the interface is increased without sacrificing synchronization.

In summary, the present invention addresses the situation of differing transfer rates by utilizing a synchronous approach. The present invention synchronously transfers image data which is scanned at a rate exceeding the transfer rate of a host terminal without experiencing the problems associated with the utilization of an asynchronous operation; the interruption of the integration period or process; and the interpolation of image data to ensure a composite line of image data.

In the synchronous operation of the present invention, the image input terminal scans the entire document at a constant, but slower, rate, while maintaining and not interrupting the integration period. This scanning process increases the number of scanlines of available valid image data and enables an apparent or virtual internal transfer (scan) rate equal to the data transfer rate of the host terminal, thereby providing synchronized transfer of data between devices wherein the internal transfer rate of the image input terminal exceeds the data transfer rate of the host terminal.

Although the present invention has been described in detail above, various modifications can be implemented without imparting from the spirit. For example, the type of data, although only described in detail with respect to image data, may be video data or any data being transferred between devices.

Moreover, the present invention has been described with respect to the number of discarded scanlines being equal to N-1. However, the number of discarded lines could be any number that would be less than N so long as the number of discarded scanlines allows the host terminal ample time to receive the data. More specifically, the number of discarded scanlines could be one out of three (N=3).

The number of scanlines to be discarded from the predetermined set can be determined by the image input terminal based on the specifications of the data to be transferred and the transfer rate of the host terminal. If the difference is a fraction of period that is required for the image input terminal to present a scanline of data to the buffer, the discard number is rounded up to insure proper transfer to the host terminal. In other words, the transfer rate of the host terminal dominates the determination of the discard ratio.

While the invention has been described with reference to various embodiment disclosed above, it is not confined to the details set forth above, but is intended to cover such modifications or changes as may come within the scope of the attached claims.

What is claimed is:

1. A system for transferring video data from an image input terminal to a host terminal, the host terminal having a transfer rate slower than a data transfer rate of the image input terminal, comprising:

control means for selecting a scan rate and a line sampling rate;

image means, operatively connected to said control means, for scanning a document at the selected scan rate and for producing a set of N scanlines of valid image data therefrom, N being equal to two or more;

buffer means, operatively connected to said control means, for storing less than N scanlines of valid image data according to the selected line sampling rate; and interface means, operatively connected to said buffer means, for outputting the stored scanlines of image data to the host terminal.

2. The system as claimed in claim 1, wherein the line sampling rate selected is periodic.

3. The system as claimed in claim 1, wherein the line sampling rate selected is determined based on a size of the document, resolution, and mode.

4. The system as claimed in claim 1, wherein the scan rate selected produces image data having a first resolution, the first resolution being higher than a resolution of the image data being received by the host terminal.

5. The system as claimed in claim 1, wherein the host terminal is an image processing unit.

6. A method for transferring video data from an image input terminal to a host terminal, the host terminal having a transfer rate slower than a data transfer rate of the image input terminal, comprising the steps of:

(a) selecting a scan rate and a line sampling rate;

(b) scanning a document at the selected scan rate and producing N scanlines of valid image data therefrom, N being equal to two or more;

(c) storing less than N scanlines of valid image data according to the selected line sampling rate;

(d) skipping scanlines of valid image data not stored in said step (c) according to the selected line sampling rate; and (e) outputting the stored scanlines of image data to the host terminal.

7. The method as claimed in claim 6, wherein said step (a) determines line sampling rate as a function of a size of the document, resolution, and mode.

8. The method as claimed in claim 6, wherein said step (a) selects a scan rate to produce image data having a first resolution, the first resolution being higher than a resolution of the image data being received by the host terminal.

9. The method as claimed in claim 6, wherein said step (a) selects a periodic line sampling rate.

10. The method as claimed in claim 6, wherein the host terminal is an image processing unit.

11. A method for transferring video data from an image input terminal to a host terminal, the host terminal having a transfer rate slower than a data transfer rate of the image input terminal, comprising the steps of: p1 (a) generating a set of N scanlines of valid image data, N being two or more and being function of a size of a document being scanned, resolution and mode;

(b) discarding N−1 scanlines of valid image data from the set of N lines of valid image data;

(c) storing a scanline of valid image data from the set of N lines of valid image data; and (e) outputting the stored scanline of image data to the host terminal.

12. The method as claimed in claim 9, wherein said step (a) periodically generates a set of N scanlines of valid image data.

13. A system for transferring video data from an image input terminal to a host terminal, the host terminal having a transfer rate slower than a data transfer rate of the image input terminal, comprising:

image means for generating a set of N scanlines of valid image data, N being equal to two or more and being a function of a size of a document being scanned, resolution, and mode;

a buffer capable of storing the generated scanlines of valid image data;

skip means for preventing said buffer from storing N−1 scanlines of valid image data from the set of N scanlines of valid image data; and interface means for outputting the stored scanlines of image data to the host terminal.

14. The system as claimed in claim 13, wherein said image means periodically generates a set of N scanlines of valid image data.

15. The system as claimed in claim 13, wherein the host terminal is an image processing unit.

16. A system for transferring scanlines of valid video data from a first device to a second device, the second device having a transfer rate slower than a data transfer rate of the first device, comprising:

counter means for counting a number of scanlines of valid video data in a set of scanlines of valid video data which has been generated for transfer and for generating a count therefrom;

state decoder means, operatively connected to said counter means, for activating a sync signal when the count is equal to a predetermined number;

buffer means for storing a scanline of the set of scanlines of valid video data when the sync signal is activated and for skipping scanlines of valid video data when the sync signal is not activated; and interface means for outputting the stored scanlines of video data to the second device;

said buffer means transferring the scanline of valid video data to said interface means when the sync signal is not activated.

17. The system as claimed in claim 16, further comprising:

image means for scanning an image and for periodically generating a set of N scanlines of valid video data.

18. The system as claimed in claim 17, wherein N is determined based on a size of a document being scanned, resolution, and mode.

19. The system as claimed in claim 18, wherein the host terminal is an image processing unit.

20. A system for transferring image data when a volume of the image data to be transferred exceeds a bandwidth characteristics of one of two devices comprising:

control means for selecting a scan rate and a line sampling rate;

image input means, in communication with said control means, for scanning an image at the selected scan rate and for producing a set of N scanlines of valid image data therefrom, N being equal to two or more;

buffer means, in communication with said image input means and said control means, for storing the N scanlines of valid image data; and processing means for receiving the stored scanlines of valid image data and for image processing the received scanlines of valid image data;

said buffer means storing less than N scanlines of valid image data when the volume of the image data to be transferred to said processing means exceeds a bandwidth characteristic of said processing means; said buffer means causing the non-stored scanlines of valid image data to be skipped, the number of scanlines of valid image data being skipped is proportional to the selected line sampling rate.

21. The system as claimed in claim 20, wherein the selected scan rate produces image data having a resolution higher than a resolution of the image data being received by said processing means.

22. The system as claimed in claim 21, wherein said processing means is an image processing unit.

* * * * *